United States Patent [19]

Molnar et al.

[11] Patent Number: 5,346,514
[45] Date of Patent: * Sep. 13, 1994

[54] VERSATILE PLANT SOD MAT AND METHOD FOR PROPAGATION

[76] Inventors: Charles I. Molnar; Judith R. Molnar, both of 12 Malvern Ct., Devon, Wilmington, Del. 19810

[*] Notice: The portion of the term of this patent subsequent to Jul. 6, 2010 has been disclaimed.

[21] Appl. No.: 85,643

[22] Filed: Jun. 30, 1993

Related U.S. Application Data

[63] Continuation-in-part of Ser. No. 716,208, Jun. 17, 1991, Pat. No. 5,224,290.

[51] Int. Cl.$^5$ .................... A01C 1/04; A01G 7/00; A01B 79/00
[52] U.S. Cl. .................................... 47/58; 47/9; 47/56
[58] Field of Search .................... 47/9, 9 C, 9 M, 9 P, 47/9 R, 9 S, 9 SC, 56, 58.25; 156/60, 61

[56] References Cited

U.S. PATENT DOCUMENTS

| | | |
|---|---|---|
| 3,511,694 | 5/1970 | Lippeldt et al. |
| 3,557,491 | 1/1971 | Franklin et al. |
| 3,914,901 | 10/1975 | Muldner |
| 4,023,506 | 5/1977 | Robey |
| 4,190,981 | 3/1980 | Muldner |
| 4,232,481 | 11/1980 | Chamouland |
| 4,336,668 | 6/1982 | Decker |
| 4,342,807 | 8/1982 | Rasen et al. |
| 4,539,038 | 9/1985 | Gombert |
| 4,584,790 | 4/1986 | Gaughen |
| 4,786,550 | 11/1988 | McFarland et al. |
| 4,934,094 | 6/1990 | Walton |
| 4,941,282 | 7/1990 | Milstein |
| 5,189,833 | 3/1993 | Clark ........................... 47/56 |
| 5,224,290 | 7/1993 | Molnar et al. ............... 47/56 |
| 5,224,292 | 7/1993 | Anton |

OTHER PUBLICATIONS

Organic Gardening, Sep. Oct. 1990, pp. 47–49 "Something Wild" by Jeff Cox.
Hort Science, vol. 18(1), Feb. 1988, pp. 89–91, "Developing Wildflower Sod" by D. L. Airhart.
Hort Science, 12(5), 1977, pp. 492–494, by Sterrett et al. "Production of Ground Covers in Sod-Like Manner".
International Plant Propagator's Society, vol. 25, 1975 pp. 408–412 "Ground Cover Sods–An Economic & Production Possibility", by Sterett.
Delaware Cooperative Ext Service, 1974, Mitchell et al. "Sod Production with Plastic Netting".

*Primary Examiner*—David T. Fox
*Assistant Examiner*—Erich E. Veitenheimer

[57] ABSTRACT

A new, improved herb, vegetable, flower, and groundcover sod mat suitable for many landscape applications. The improvement comprises growing either plant seeds seedlings, plant plugs, rooted cuttings or root divisions in a planting medium so that the roots of the plant material entangle with a nylon sod reinforcement to form a tough, lightweight, flexible sod mat. The sod mat can be produced in many strengths and weights, with many diverse planting mediums, with multiple species of plants. The nylon sod reinforcement will degrade if it is uncovered by some accident and exposed to sunlight. Sod mats may be sold in roll form or a rectangular mats.

20 Claims, 6 Drawing Sheets

VERSATILE PLANT SOD MAT AND METHOD FOR PROPAGATION

This is a continuation-in-part of application Ser. No. 07/716,208, filed on Jun. 17, 1991, now U.S. Pat. No. 5,224,290.

FIELD OF INVENTION

This invention relates to a new, versatile herb, vegetable, flower, and groundcover sod mat for many landscaping or home applications.

BACKGROUND—DESCRIPTION OF PRIOR ART

Flower and grass sod mats have long been used in commercial industry. Reinforced flower and groundcover sod mats were tested in the 1970's. These sod mats have serious commercial limitations for the commercial grower, landscaper or consumer. Some also have environmental limitations.

Many flower and grass sod mats contain ungerminated seeds. Germination and early seedling growth requires adequate rainfall and good soil temperature. In addition, the type of soil is often problematic. Also, many of these seed sod mats require complex, expensive and specialized equipment which makes producing small custom lots difficult and expensive for small landscape jobs. Also, many of these use moisture sensitive glues or other ingredients which may lead to storage or shipping instabilities or even premature germination.

Flower and sod mats grown on a very open plastic netting for sod reinforcement are difficult to completely cover with thin planting mediums, use significant synthetic material per square meter and often have delayed harvest times due to the open structure. Plastic netting which is less open often damages the seedling roots by girdling them.

Flower sod mats grown on REEMAY ® polyester spunbond fabrics are limited because the polyester is not degradable, synthetic plastic consumption per square acre is often higher than needed, and only a limited range of strengths are suitable for good commercial sod mat production. Very low weight polyester spunbond fabrics are not generally commercially available. Higher polyester spunbond fabric weights and strengths can retard seedling root penetration. For these reasons, the type of planting medium, planting medium weight, and planting depth are limited for best commercial production.

Thus sod mats heretofore known in the art suffer from a number of disadvantages:

(a) Their manufacture requires expensive, complex equipment. Often this equipment by its nature prevents optimum flower or groundcover production for small landscapers and/or customers.

(b) Sod mats containing seeds only prevent economical production of sod mats of many herb, vegetable, flower, and groundcover species which are better propagated by cuttings, plant plugs, seedlings or plant divisions and the like.

(c) Sod mats limited to seeds require controlled environmental conditions such as moisture for best germination. This leads to extra dollar, time and convenience expense for the landscaper or customer (if water is available).

(d) Many sod mats are sensitive to moisture and humidity and may prematurely delaminate, decompose, germinate, or fall victim to fungus, diseases, or insects.

(e) Sod mats often contain more synthetic plastic than necessary for reinforcement of the specific flower sod because of limitations in availability of the reinforcement.

(f) Some sod mat reinforcements can only be used in lower strength ranges for good production of sod mats. This limits the species of plant materials which can be economically grown and the general applicability of the resulting sod mat.

(g) Current known REEMAY ® polyester sod mat reinforcement will not decompose if exposed to sunlight due to heavy traffic or rain fall and the like forcing the contractor and/or customer to cut away the unsightly portions and clean up if this occurs.

(h) Known sod mats do not use second quality reinforcement products for production.

(i) Traditional vegetables, herbs, groundcovers, and bedding plants are sold in pots and flats, which consume valuable natural resources for packaging and further add to the society's refuse problem.

(j) Traditional plant pots and flats are required by the grower in many styles and sizes for herbs, vegetables, flowers and groundcovers at considerable expense to the grower for inventory, storage, handling and disposal costs.

OBJECTS AND ADVANTAGES

Accordingly, objects and advantages of the present invention are:

(a) to provide a method of producing sod mats which does not require expensive, complex equipment and which can easily produce small custom lots meeting customers' needs;

(b) to provide a sod mat which can easily use optimum propagation techniques for the herb, vegetable, flower or groundcover species desired;

(c) to provide a sod mat containing viable, healthy seedlings, plant plugs, root divisions, or rooted cuttings with well developed roots for immediate planting;

(d) to provide a sod mat which will not decompose when exposed to high humidities or moisture and thus give excellent storage and shipping characteristics;

(e) to provide a sod mat with the minimum necessary synthetic plastic reinforcement to both conserve natural resources and minimize synthetic plastic addition to our landscapes;

(f) to provide a sod mat reinforcement which contains maximum flexibility in reinforcement strength and hence, maximum utility for many plant species and applications;

(g) to provide a sod mat reinforcement which will decompose if uncovered and exposed to sunlight by some accident;

(h) to provide a sod mat which will efficiently use second quality grade synthetics for reinforcement and hence, reduce the refuse problem;

(i) to provide a flower or groundcover product which dramatically reduces the need for traditional packaging and hence, reduces the refuse problem and reduce production costs;

(j) to provide the grower with a flexible sod mat system of packaging retail sales which reduces his inventory, storage, and handling costs while also reducing the complexity of his inventory needs.

BRIEF DESCRIPTION OF DRAWINGS FIGURES

A brief description of the figures and reference numerals follows.

REFERENCE NUMERALS IN DRAWINGS

40 Surface the sod mat is growing on (usually plastic film)
42 Nylon sod reinforcement
44 Planting medium
46 Woodchips
48 Seeds, plant plugs, seedlings, root divisions, or rooted cuttings
50 Crop cover
52 Mature seedlings, plant plugs, root divisions, or rooted cuttings ready for harvest.
54 Seedling, plant plug, root division, or rooted cutting plant roots
58 Nylon fibers
60 Bonded fiber region
62 Nonbonded fiber region
64 X-direction
66 Y-direction
68 Z-direction
70 Prepare appropriate flat for planting.
72 Install nylon sod reinforcement.
74 Install planting medium.
76 Add seeds, seedlings, plant plugs, root divisions, or rooted cuttings to medium.
78 Keep moist and fertilize.
80 Harvest.
82 Prepare field for weed guard and lay down plastic film weed guard.
84 Install bed edging.

SUMMARY OF THE INVENTION

Our invention is a new and improved plant sod mat comprising a nylon sod reinforcement wherein said nylon sod reinforcement comprises a nylon nonwoven fabric and a layer of planting medium on said nylon sod reinforcement and containing viable plants growing in said planting medium and whose roots penetrate and entangle with said nylon sod reinforcement and thus, form a sod mat. Said nylon nonwoven fabric has a preferable basis weight of less than or equal to about 5 opsy and more preferably a basis weight of less than or equal to about 3 opsy and even more preferably a basis weight of less than about 1 opsy and most preferably a basis weight of less than or equal to about 0.5 opsy. Preferred nylon sod reinforcements are comprised of nylon nonwoven fabrics. Especially preferred nylon nonwoven fabrics comprise nylon spunbond fabrics, nylon hydroentangled fabrics, or nylon melt blown fabrics.

A preferred embodiment of our invention is a new, improved plant sod mat comprising a nylon sod reinforcement wherein said nylon sod reinforcement is a pattern bonded, nylon spunbond fabric of less than or equal to about 5.0 ounces per square yard or an area bonded, nylon spunbond fabric of less than or equal to about 1.0 ounces per square yard and a layer of planting medium on said nylon sod reinforcement and containing viable herb, vegetable, flower, or groundcover seedlings, rooted cuttings, root divisions or plant plugs growing in said planting medium and whose roots penetrate and entangle with said nylon sod reinforcement and thus, form a sod mat. Based on our discovery, we have by figures, explanation, and example shown why nylon sod reinforcements are so effective in producing these new, diverse, and valuable herb, vegetable, flower, and groundcover sod mats. We have also disclosed how to design and produce the most preferable herb, vegetable, flower, and groundcover sod mats.

DESCRIPTION OF PREFERRED EMBODIMENTS

FIGS. 1-4

Figure 1:
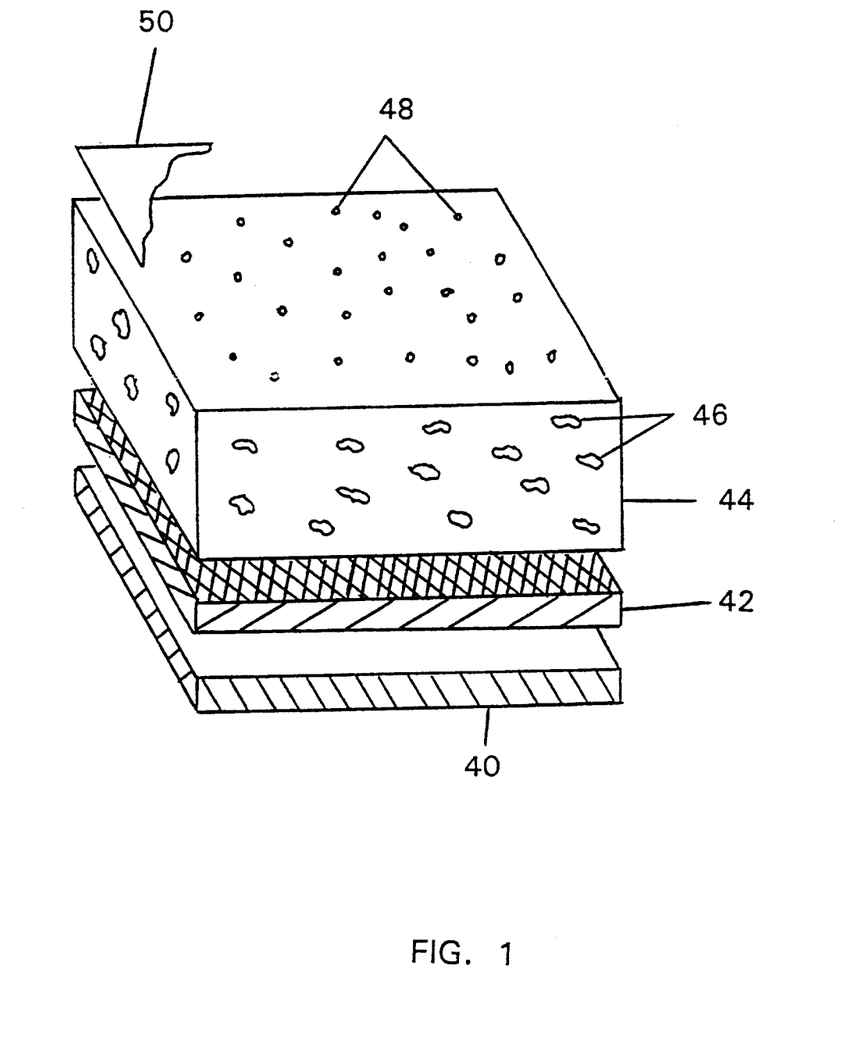
FIG 1 is a simplified perspective view of a newly planted flower sod mat.

FIG. 1 is a fragmentary cross section of a typical flower sod mat according to this invention. Reference Numeral 40 is a suitable surface on which to grow sod mats such as 4 mil black polyethylene film mulch or a porous polyethylene sheet such as VISPORE ® manufactured by Tredigar in Richmond, Va. Other representative surfaces include plywood, rubber sheets, or a concrete slab. In a field grown application the sod mat growing surface needs to prevent weeds from growing into and through the flower sod mat from the soil below and also to encourage the flower roots to grow laterally and form a sod. In a fiat grown application, the thin plastic film can serve to contain the roots and planting medium (Reference Numeral 44) in a flat with an very open bottom and also make sod mat removal easy at harvest time. Reference Numeral 42 is a nylon sod reinforcement consisting of a nylon nonwoven fabric. An example of a preferred nylon nonwoven fabric is a nylon spunbond fabric such as CEREX ® and PBN II ® marketed by Fiberweb North America Inc. in Greenville, S.C. CEREX ® is an example of an area bonded, nylon spunbond fabric. PBN II ® is an example of a pattern bonded, nylon spunbond fabric. Ergon ENNY 0239 is an example of a nylon melt blown nonwoven fabric and is marketed by Ergon in Jackson, Miss. Reference Numeral 44 is the planting medium. The planting medium is adjusted to the optimum depth for the herb, vegetable, groundcover, or flower species of sod mat being grown. FAIRGROW ® is a good growing medium manufactured by Delaware Solid Waste Authority in Wilmington, Del. Many other planting mediums can also be used. Examples include but are not limited to potting soil, METRO-MIX ® and REDI-EARTH ® manufactured by W. R. Grace. Further examples of suitable planting mediums are disclosed in U.S. Pat. Nos. 4,720,935 by Rogers et. al., 4,934,094 by Walton, 4,941,282 by Milstein, and 4,986,026 by Decker and are included by reference. Light weight planting mediums are particularly preferable and have a dry volume density below 700 grams per liter dry weight and more preferably below 500 grams per liter dry weight. Planting mediums with a dry volume density of greater than or equal to about 150 grams per liter dry weight are preferred. Reference Numeral 46 represents planting medium amendments such as the demolition woodchips manufactured by Corrado American in Wilmington, Del. and can be added to the planting medium (Reference Numeral 44). Other planting medium amendments are also effective such as PERLITE ®, vermiculite, hay and straw and are well known to those skilled in the art. Reference Numeral 48 represents various means to start plants such as the seeds, seedlings, plant plugs, rooted cuttings, or root divisions added to the planting medium (Reference Numeral 44). Reference Numeral 48 also represents other means of starting plants where appropriate such as cuttings and viable plant material derived from various types of plant tissue culture and thus are meant to be included in the seeds. seedlings, plant plugs, rooted cuttings and root divisions definition above. Thus various means to start plants are referred to as plant starting materials in this specification (Reference Numeral 48). Seedlings are usually planted in a 10–20 cm grid pattern. Reference Numeral 50 represents an optional crop cover such as REEMAY ® 2006 manufactured by Reemay, Inc. in Old Hickory, Tenn. This can serve to warm the soil up quickly in the spring and/or for some protection from marauding animals such as rabbits or birds.

Figure 2:
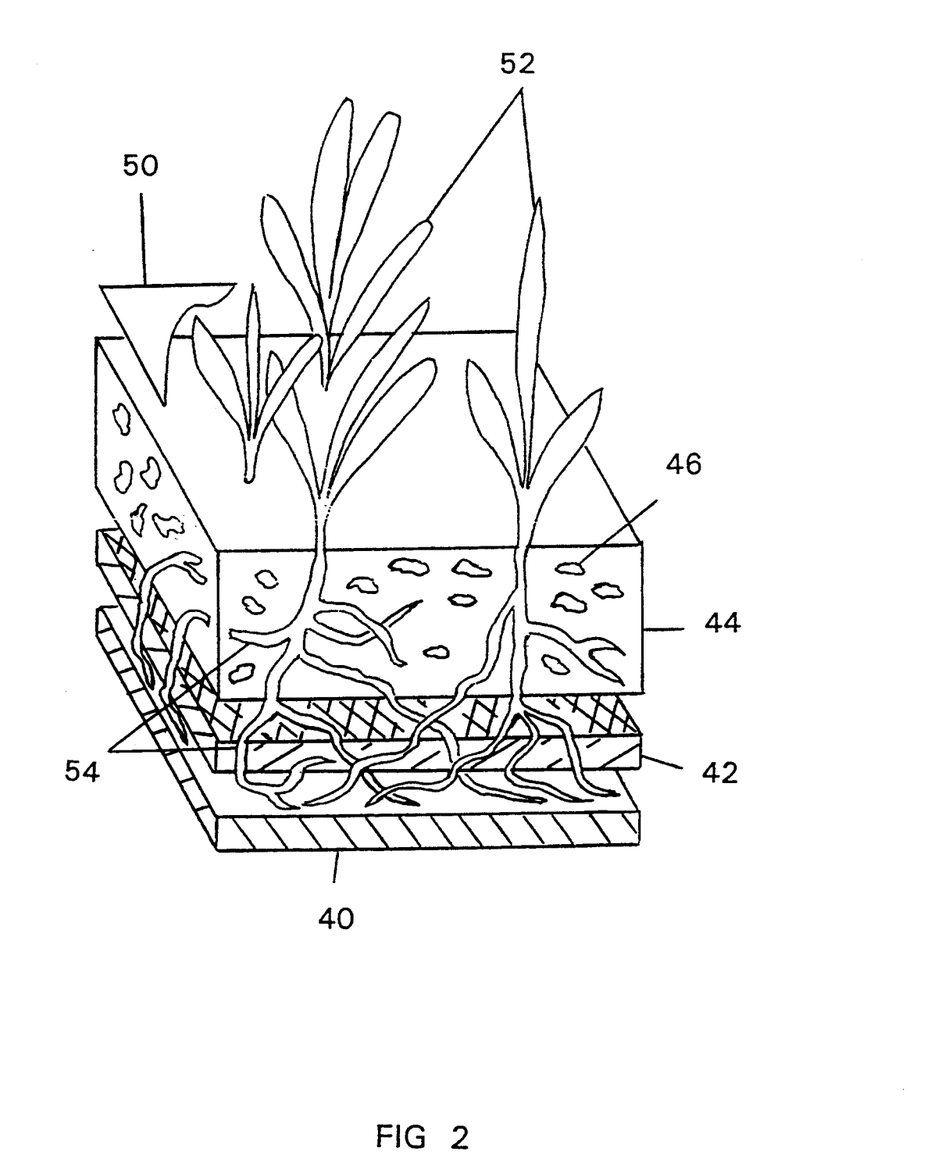
FIG 2 is a simplified perspective of a seedling sod mat ready for harvest.

FIG. 2 is a fragmentary cross section of a mature sod mat according to this invention. Reference Numeral 44 is the planting medium. Reference Numeral 40 is a suitable surface on which to grow sod mats. Reference Numeral 42 is a nylon sod reinforcement. Reference Numeral 52 depicts the plant seedlings, root divisions, rooted cuttings, or plant plugs in the planting medium (Reference Numeral 44) ready for harvest. A preferred class of plants comprise nutritional plants such as herbs or vegetables. Some examples of nutritional plants are cherry tomatoes and thyme. Another preferred class of plants comprises ornamental plants such as flowers and groundcovers. Some examples of ornamental plants include liriope spicata, bedding plants, hostas, and wildflowers. Collectively ornamental plants and nutritional plants are referred to as garden plants in this specification. Another preferred class of plants are grasses. Examples of preferred grasses are bunch grasses and shade grasses. Tall fescue grasses and perennial rye grasses are examples of bunch grasses. Reference Numeral 54 depicts the roots of the seedling, root divisions, rooted cuttings or plant plugs penetrating and entangled to each other and to nylon sod reinforcement (Reference Numeral 42) and the planting medium (Reference Numeral 44). It is this root penetration and entanglement which makes these sod mats very tough and easy to handle. Reference Numeral 50 is an optional crop cover such as hay for over winter, wind and frost protection.

We have discovered that the nylon sod reinforcement must permit easy penetration of the root structure and also must have enough tear strength in combination with the root entanglement to permit easy handling of the sod mat without tearing. This is no small task since the sod weights can vary significantly. For instance, liriope spicata generally prefers a 5 cm depth of planting medium. Wildflower mixes usually are grown at a 2.5 cm depth. In addition, different growers, because of availability and price, prefer different planting mediums such as potting soil, humus/wood chip mixture, sphagnum moss and PERLITE ® mixture, or other commercially prepared planting mediums such as REDI-EARTH ® or METRO-MIX ®. Each of these planting mediums have different dry densities, they pick up different amounts of water and hence planting medium weights vary by a factor of two or three or more. In addition, it is common to pin sods on slopes greater than 10–20 degrees to prevent the sods from washing down before rooting with the subsoil is complete. Pinning adds an additional stress to the sod reinforcement. In addition to the physical weights, required strengths are also affected by how customers handle the sod mat—some gently and some roughly.

Thus, sod mat reinforcements from very light weights (and low tear strengths) to relatively heavy weights (and high tear strengths) are required for the many different types of customers and customer applications. In addition, the sod mat reinforcement should promote good root wetting for plant growth. We have discovered that nylon sod reinforcements wherein the nylon sod reinforcement is a nylon nonwoven fabric make excellent, versatile sod reinforcements when used according to this invention. Some representative examples of nylon nonwoven fabrics are nylon dry laid fabrics, nylon wet laid fabrics, nylon melt blown fabrics, nylon hydroentangled fabrics, and nylon spunbond fabrics. Preferred types of nylon nonwoven fabrics are nylon melt blown fabrics, nylon hydroentangled fabrics, and nylon spunbond fabrics. Nylon nonwoven fabrics are defined as nonwoven fabrics and nonwoven webs comprised of nylon fibers. Area bonded, nylon spunbond fabrics and pattern bonded, nylon spunbond fabrics are ideal for these applications because they offer exceptional reinforcement flexibility, excellent root wetting, and excellent root penetration. Entangled nylon nonwoven fabrics are very good nylon sod reinforcements because they offer exceptional root penetration, good root wetting, and excellent root penetration and entanglement. Examples of entangled nylon nonwoven fabrics are nylon melt blown nonwoven fabrics and hydroentangled nonwoven fabrics. Nylon melt blown nonwoven fabrics are especially preferred for lightweight sod mats. Nylon general, very versatile. Nylon 6 and nylon 6,6 are preferred nylon chemistries. Since nylon will normally degrade if no ultraviolet light stabilizers are added, nylon nonwoven fabrics often have the additional advantage of being photodegradable. Both CEREX ® and PBN II ®, are examples of an area bonded, nylon spunbond fabric and a pattern bonded, nylon spunbond fabric, which do not have ultraviolet light stabilizers and thus, will degrade if exposed to the sunlight.

Methods for the manufacture of nylon nonwoven fabrics are well known to those skilled in the art. Illustrations am found in the well known Kirk-Othmer Encyclopedia of Chemical Technology published by John Wiley and Sons, London/New York, Vol. 16, 3rd Edition, 1978, pages 72–124. Other illustrative examples of processes to manufacture nylon nonwoven fabrics are U.S. Pat. Nos. 5,151,320 to Homonoff et al., 4,997,661 to Hartmann, 4,753,834 to Braun, 4,356,229 to Brodnyan et al., and 3,795,571 to Prentice and are included herein by reference. These references are not meant to limit nonwoven fabrics or technologies useful in this invention, but only to serve as helpful guidance to those skilled in the art. Suitable nonwoven fabrics are readily available commercially from Ergon in Jackson, Miss., Fiberweb North America in Greenville, S.C., and Freudenberg in Durham, N.C. and are discussed below in additional detail.

Figure 3:
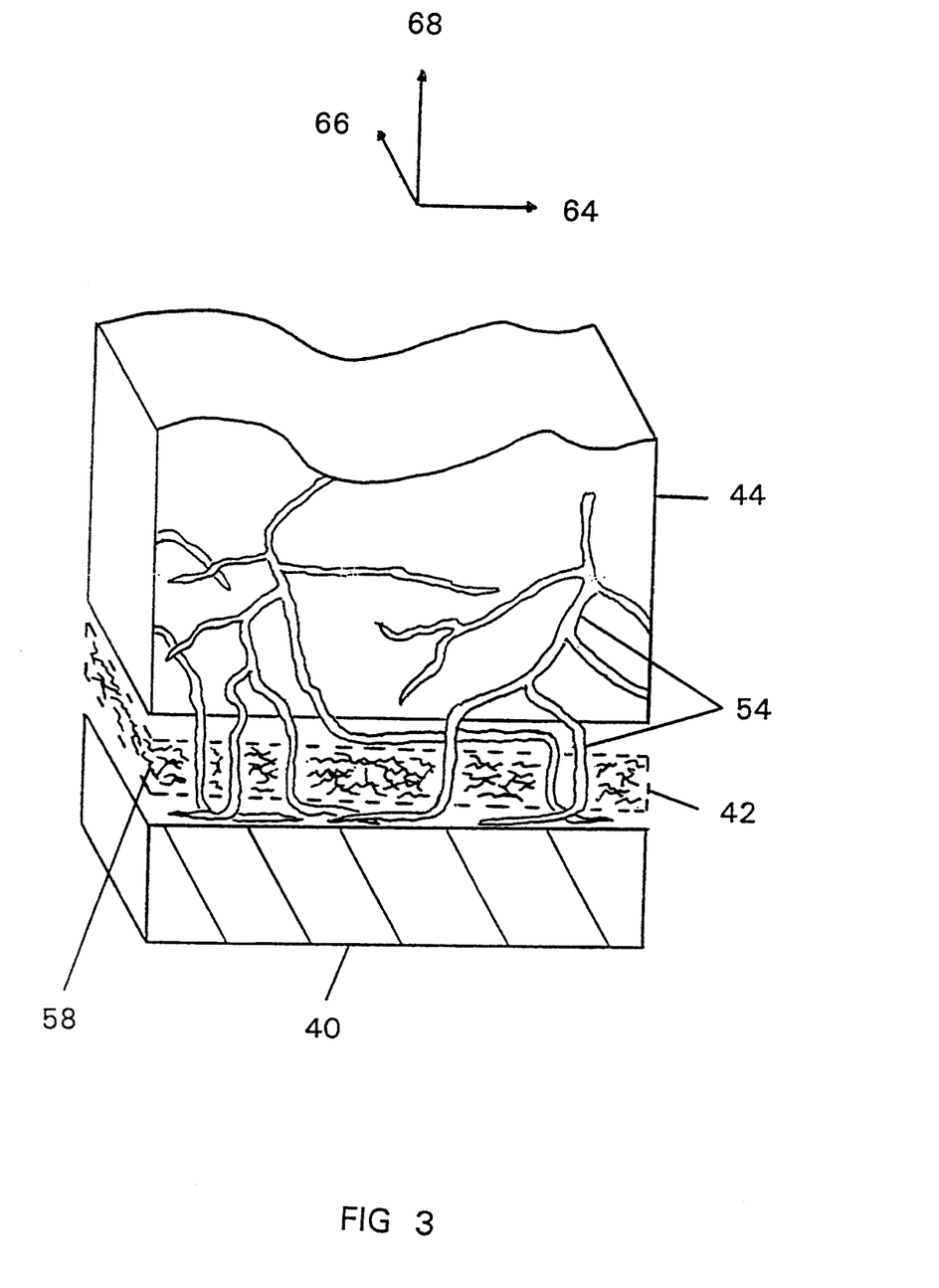
FIG. 3 is an artist's conception of the root penetration in area bonded nylon spunbond fabric.

An example of a preferred nylon nonwoven fabric is an area bonded, nylon nonwoven fabric. A preferred example of an area bonded, nylon nonwoven fabric is an area bonded, nylon spunbond fabric such as CE-REX ®. Area bonding refers to fabrics where the fibers in the fabric (for example, Reference Numeral 58 of FIG. 3) are bonded at essentially all fiber junctions (or cross-over points) to each other. The area bonded nylon fabric family of products offers unique strength to weight ratios, excellent porosity, excellent root wetting characteristics, and photodegradability. They are also commercially available in lower weight per unit area than REEMAY ® polyester spunbond fabrics. FIG. 3 is an artist's conception of the root penetration in area bonded, nylon spunbond fabrics. As the roots (Reference Numeral 54) penetrate the nylon sod reinforcement (Reference Numeral 42), they must either stretch or break the nylon fibers (Reference Numeral 58) to create a large enough hole in the X-direction and Y-direction (Reference Numerals 64 and 66, respectively in FIG. 3) to grow through. Hence as the roots penetrate the area bonded, nylon fabrics, they generally do so in the Z-direction (Reference Numeral 68). They generally do not tear the nylon sod reinforcement (Reference Numeral 42) in the Z-direction (Reference Numeral 68) because the nylon sod reinforcement (Reference Numeral 42) is so thin and because all fibers are bonded together. Area bonded, nylon spunbond fabrics offer numerous advantages over area bonded, polyester spunbond fabrics such as REEMAY ®. First, area bonded nylon fabrics are commercially available in lower weights and tear strengths, second, higher porosity is available than with REEMAY ®, and third, water swell further expands the nylon spunbond fabric and also further weakens it. In general, water expands nylon nonwoven fabrics facilitating good root penetration and entanglement. All of these factors promote easy, rapid seedling root penetration in the nylon sod reinforcement (Reference Numeral 42) and hence, good sod mat production and performance characteristics. Preferable area bonded, nylon spunbond fabrics range in weights from 1.0 opsy to 0.03 opsy and more preferably from 0.7 opsy to 0.03 opsy and most preferably from 0.5 opsy to 0.03 opsy. Current sod mat production experience and extrapolations suggest that 0.03 opsy basis weight nylon nonwoven fabrics will form a useful nylon sod reinforcement. A lower fabric basis weight of 0.1–0.3 opsy is currently most efficient to manufacture and thus often preferred. In preferable ranges, area bonded nylon fabrics offer exceptional tear strengths, photodegradability, excellent root wetting characteristics, and porosity which in combination makes them an exceptionally fine sod mat reinforcement for light weight applications.

Figure 4:
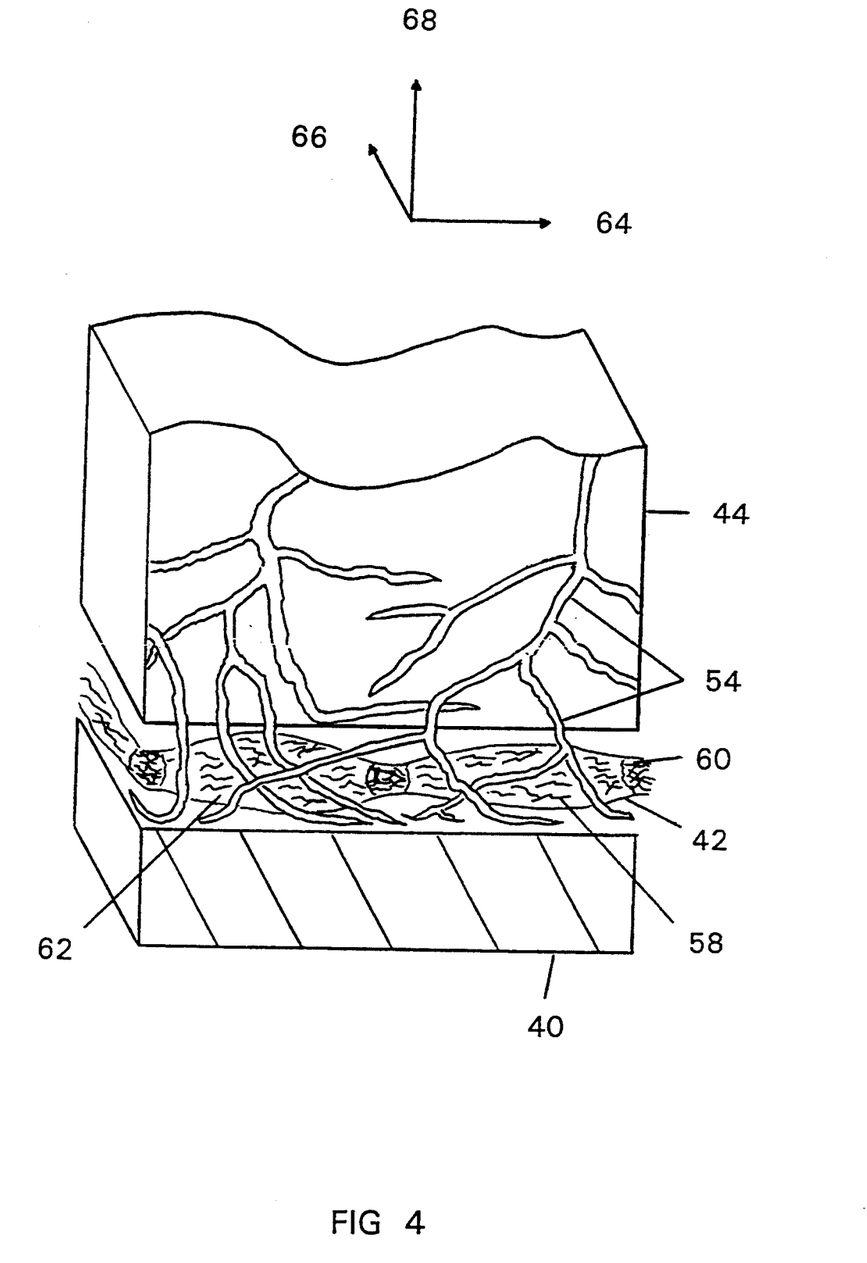
FIG. 4 is an artist's conception of the root penetration in the pattern bonded nylon spunbond fabric.

Another example of a preferred nonwoven fabric is a pattern bonded, nonwoven fabric. An example of a preferred pattern bonded, nonwoven fabric is a pattern bonded, nylon spunbond fabric such as PBN II ®. Pattern bonding means that only localized regions of the spunbond fabric are bonded and the remaining non-bonded fiber regions contain nylon fibers which can move, entangle and otherwise promote excellent seedling root entanglement to form exceptional sod mats. Those skilled in the art can employ light tacking of the fibers in the nonbonded area to facilitate manufacture and handling of the nylon nonwoven fabric in some cases (For example, see Kirk Othmer Encyclopedia of Chemical Technology, supra). These lightly tacked fiber regions are considered to be nonbonded fiber regions since they retain the very good root penetration and entanglement characteristics similar to nonbonded fiber regions. The area ratio of the nonbonded fiber region (Reference Numeral 62) to the bonded fiber region (Reference Numeral 60) is the nonbonded fiber region's surface area in square centimeters divided by the bonded fiber region's surface area in square centimeters. For example, if a particular pattern bonded, nylon spunbond fabric has a total area of 110 square centimeters of which the surface area of the nonbonded fiber region (Reference Numeral 62) is 100 square centimeters and the surface area of the bonded fiber region (Reference Numeral 60) is 10 square centimeters, then the area ratio of nonbonded fiber region to the bonded fiber region is 10/1. This area ratio is preferably less than about 1000/1 and more preferably less than about 100/1 and even more preferably less than about 30/1 for many applications. For especially environmentally friendly applications, the area ratio is preferably from about 15/1 to 100/1 and more preferably from 15/1 to 1000/1. Pattern bonded nylon fabrics function well as a nylon sod reinforcement (Reference Numeral 42) at both very low tear strengths and surprisingly high tear strengths. Additional advantages include excellent porosity, root wetting characteristics, and as with most nylon, the elongation increases and the strength decreases when wet which promotes excellent root penetration and entanglement. FIG. 4 is an artist's conception of the root penetration in pattern bonded nylon fabrics. It is our belief that most of the roots (Reference Numeral 54) penetrate the nylon sod reinforcement (Reference Numeral 42) in the nonbonded fiber regions (Reference Numeral 62) and few roots, if any, penetrate in the bonded fiber regions (Reference Numeral 60). In addition, in the nonbonded fiber regions, since the roots can grow between and entangle individual fibers in a random fashion in all directions (Reference Numerals 64, 66, and 68), the seedlings tend to displace or mechanically tear the nylon fibers (Reference Numeral 58) in the pattern bonded nylon fabrics in the X-direction, Y-direction, and Z-direction (Reference Numeral 154, 66, and 68, respectively in FIG. 4). The three dimensional displacement and tearing of the nylon fibers (Article 58) has several important advantages—easier, faster root penetration and better root entanglement to bond the nylon sod reinforcement (Reference Numeral 42) and planting medium (Reference Numeral 44) together. Together, these advantages translate into dramatically improved production and performance characteristics. In mature, transplanted sods (2 or more years) as the roots (Reference Numeral 54) grow and expand, the pattern bonded nylon fabric will be torn in all directions (Reference Numerals 64, 66, and 68) allowing it to more easily be assimilated into the surrounding soil and generally improving environmental friendliness.

Entangled nylon nonwoven fabrics also make excellent nylon sod reinforcements. The entangled nylon fibers facilitate good root penetration and entanglement along with good root wetting. Hydroentangled nonwovens can have relatively uniform entanglement across the surface area. For the purposes of this specification these are called area entangled nonwoven fabrics. Hydroentangled nylon nonwoven fabrics can also be made with regions with very high fiber entanglement regions and very low fiber entanglement regions. For purposes of this specification, these are called pattern entangled nonwoven fabrics. Pattern entangled nonwovens have excellent root penetration and entanglement similar to pattern bonded, nylon spunbond fabrics. Sod mats using nylon hydroentangled nonwoven fabric sod reinforcements have very good sod mat production characteristics and good sod mat strengths.

For these reasons, if a grower needs to use a very dense planting medium (Reference Numeral 44), needs to grow seedlings which need a deep planting medium or needs to harvest the product while it is very wet, then strong pattern bonded nylon fabrics are the best choice. Hydroentangled nylon nonwovens are also a preferred choice for these uses. Certain applications will also require the photodegradability and environmental friendliness of pattern bonded nylon nonwoven fabrics or pattern entangled nylon nonwoven fabrics. Preferable nylon sod reinforcements wherein the nylon sod reinforcement is a nylon nonwoven fabric have a preferable basis weight of less than or equal to about 5 opsy and more preferably a basis weight less than or equal to about 3 opsy and even more preferably a basis weight of less than about 1 opsy and most preferably a basis weight less than or equal to about 0.5 opsy. In general, preferable nylon nonwoven fabric basis weights are greater than or equal to about 0.03 opsy and more preferably greater than or equal to about 0.1 opsy and even more preferably greater than or equal to about 0.2 opsy. Preferable pattern bonded, nylon spunbond fabrics range in fabric weight from about 5.0 opsy to 0.03 opsy and more preferably from about 1.0 opsy to 0.03 opsy and even more preferably from about 0.5 opsy to about 0.03 opsy. Current sod mat production experience and extrapolations suggest that 0.03 opsy will form a useful nylon sod reinforcement. A lower fabric basis weight of 0.2-0.3 opsy is currently most efficient to manufacture and thus often preferred. This is expected to drop in the future. In preferable ranges, pattern bonded, nylon spunbond fabrics offer an exceptionally broad range of tear strengths, photodegradability, excellent root wetting characteristics, porosity, and environmentally friendly characteristics which in combination makes them an exceptionally fine sod mat reinforcement for numerous sod mat applications.

In general, nylon nonwoven fabrics with a particular range of air permeability make very good nylon sod reinforcements because they have good porosity to facilitate plant root penetration and entanglement and good sod mat production characteristics. This is shown in Table 1 and examples below. Nylon nonwoven fabrics with air Is permeability from about 200 to 1600 cfm/sf are preferred and more preferred are nylon nonwoven fabrics with air permeability of from about 400 to 1500 cfm/sf and even more preferred are nylon nonwoven fabrics with air permeability of from about 800 to 1500 cfm/sf and most preferred are nylon nonwoven fabrics with air permeability of from about 1000 to 1450 cfm/sf. Extrapolations suggest that nylon nonwoven fabrics with an air permeability above 1600 cfm/sf will also make good nylon sod reinforcements. Air permeability is measured by ASTM Test Method D737 at 0.5 inch of water.

Process Description

Figure 5:
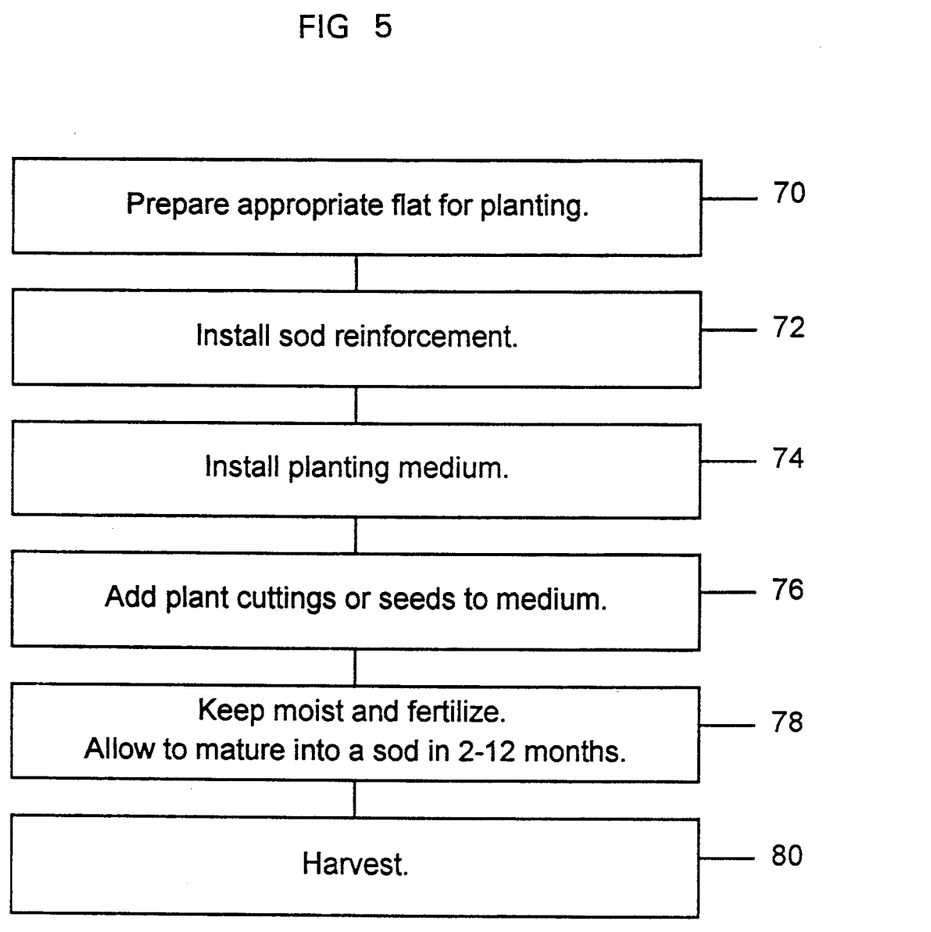
FIG. 5 is a block diagram illustrating the container process of the invention.

In FIG. 5, there is shown a block diagram illustrating the general process of growing herb, vegetable, flower, or groundcover sod mats in a container according to this invention. The six generalized steps are: (1) the step 70 of selecting an appropriate flat for growing the herb, vegetable, flower, or groundcover sod. Generally the flat is from 5-10 cm deep, about 25-40 cm wide and 50-70 cm long. Size is selected based on the depth the flowers need to grow efficiently and on overall weight. Weight is generally held to a carrying weight of 10-30 kg or less. If a bottom suitable for roots to grow on is not inherent in the flat design, a separate layer of plastic film (such as VISPORE ® or one of numerous black plastic film mulches) is installed on the bottom. Porous plastic films are especially useful in flat propagation applications. The plastic film then becomes Reference Numeral 40 and serves to contain the sod mat roots which penetrate the spunbond fabric installed in the next step. The plastic film also makes removing the sod mat at harvest time easier in many cases. (2) the step 72 consists of installing the nylon sod reinforcement (Reference Numerical 42) on this plastic film or bottom of the flat (Reference Numeral 40). (3) step 74 consists of installing the planting medium (Reference Numeral 44) to the depth required of the herb, vegetable, groundcover, or flower species. (4) step 76 consists of adding the seeds, seedlings, plant plugs, rooted cuttings, or root divisions (Reference Numeral 48) of the desired species to the planting medium (Reference Numeral 44). (5) step 78 consists of normal feeding and care of the seeds, seedlings, rooted cuttings, root divisions or plant plugs (Reference Numeral 48) for maximum growth. This includes watering and fertilizing. MIRACLE-GRO ® manufactured by Stern's Miracle-Gro Products, Inc. in Port Washington, N.Y. is a good fertilizer when applied at an approximate concentration of one half teaspoon per gallon and a frequency of about every other week. One needs to take care not to over or under water the medium. A flat which drains and uses porous polyethylene is often advantageous. The sod mat is preferably propagated for about 1 to 18 months and more preferably for about 2 to 12 months. (6) step 80 consists of harvesting the sod by removing the sod mat from the flat and selling as a herb, vegetable, groundcover, or flower sod mat. If a plastic film was used in the fiat, it is also removed from the sod mat before final planting.

Figure 6:
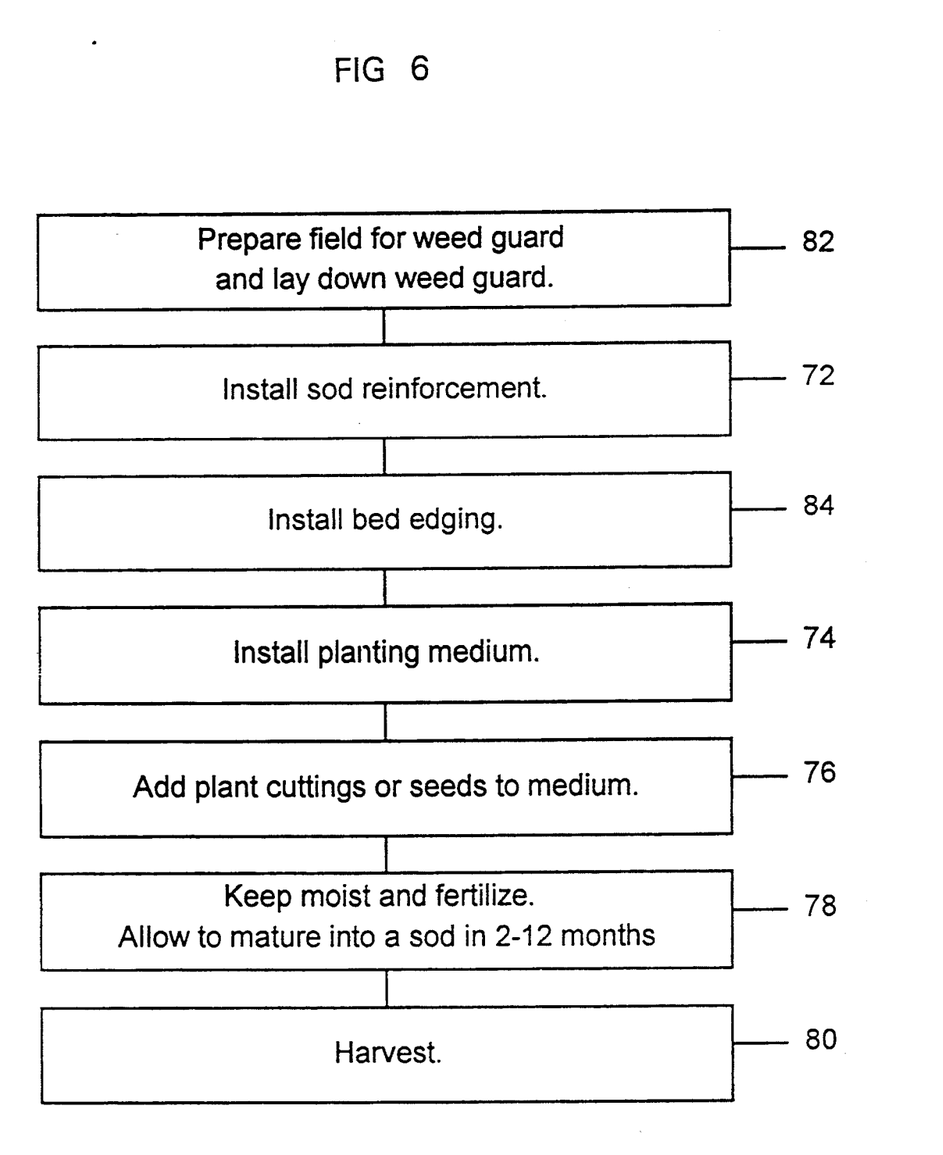
FIG. 6 is a block diagram illustrating a typical field process of the invention.

FIG. 6 is a block diagram illustrating the general process for growing groundcover or flower mats in a field according to this invention. The seven general steps are: (1) Step 82 consists of preparing the field beds by tilling the soil, removing any major weeds left, and then grade and smooth out. Lay down a plastic weed guard barrier such as 4 mil black polyethylene film or suitable porous polyethylene film (Reference Numeral 40). For field grown applications, normally the black polyethylene film is preferred to keep down weeds. In certain circumstances, herbicides may also be used to keep down weeds. Normally, rows 8 ft wide by 100-200 ft long are used. Aisles 3 ft wide are left between the rows for access and are mulched heavily with wood chips to prevent weed growth. (2) in step 72 the nylon sod reinforcement (Reference Numeral 42) is laid on top of the plastic film (Reference Numeral 40 shown in the preceding FIG. 1). (3) step 84 consists of installing a raised bed railing of 4" by 4" rot resistant treated lumber to contain the planting medium (Reference Numeral 44) and prevent weed encroachment on the flower beds. (4) step 74 consists of laying the planting medium (Reference Numeral 44) down to the preferred planting depth for the specific plants. Examples include 5 cm deep for liriope spicata, 5 cm deep for houttuynia, 2.5 cm deep for aegopodium, 2.5 cm for creeping phlox and 2.5 cm for thyme. An example of a growing medium is a mixture of 70% FAIRGROW ® manufactured by Delaware Solid Waste Authority in Wilmington, Del. and 30% demolition wood chips manufactured by Corrado American in Wilmington, Del. Planting medium amendments such as hay, straw, vermiculite and the like can be added as desired in this step. Drenching is useful with some planting mediums. (5) step 76 consists of adding the seeds, seedlings, plant plugs, rooted curings or root divisions (Reference Numeral 48) of the desired species to the planting medium (Reference Numeral 44). Liriope is generally planted on a 10 cm grid pattern and ivy is planted on a 25 cm grid pattern. Alternately, a wildflower seed mix has been applied at 0.2-2 lbs per 1000 square feet depending on application and specific mix. (6) step 78 consists of keeping the planting medium moist and fertilizing to assure good germination of the seeds and growth of the plant plugs, rooted cuttings, root divisions, seedlings or germinated seeds. Automated irrigation systems marketed by Buckher, Inc. manufactured in Fresno, Calif. work well for this purpose. If desired for environmental control reasons, common crop covers (Reference Numeral 50) such as REEMAY ® 2006 may be used to protect newly planted seeds from foraging birds or, alternately to warm the soil in the spring. Common crop covers (Reference Numeral 50) such as REEMAY ® 2006 or hay may also be used in the fall to help protect from snow damage. Preferably allow sod to mature for 1-18 months and even more preferably allow sod to mature for 2-12 months. (7) step 80 consists of harvesting the sod mats. The sod mats can be harvested in rectangles of generally 25 to 40 cm by 40 cm to 100 cm. The dimensions usually are adjusted to keep the sod rectangle between 10 and 35 kg. Alternately with most plants, the sod mats can be rolled up on 3" or 4" Schedule 40 PVC plumbing pipe in widths of 4'. Generally, sods less than 3 cm thick are harvested in rolls. The plastic film (Reference Numeral 40) is removed before sale.

EXAMPLES

The following experimental examples, along with the reference physical properties in Table I below, will serve to further explain the invention and demonstrate the advantages which are attributable thereto. These examples are not meant to limit the nylon reinforced sod mats useful in this invention, but only to serve as helpful guidance to those skilled in the art in understanding how a few of the preferred embodiments of this invention might be practiced.

TABLE I

| Product code | Weight (opsy) | Tear Strength Machine Dir. (lbs) | Tear Strength Transverse Dir. (lbs) | Air Permeability (cfm/sf) |
|---|---|---|---|---|
| PBN II ® | 0.3 | 2.9 | 1.8 | 1350 |
| PBN II ® | 0.5 | 4.8 | 2.7 | 1100 |
| PBN II ® | 1.0 | 10.0 | 6.0 | 640 |
| PBN II ® | 2.0 | 21.0 | 14. | 250 |
| PBN II ® | 3.0 | 34 | 24 | 180 |
| CEREX ® | 0.3 | 4.6 | 2.6 | 1340 |
| CEREX ® | 0.4 | 5.5 | 3.4 | 1130 |
| CEREX ® | 0.5 | 6.4 | 4.3 | 950 |
| ENNY 0239 | 0.4 | ND* | ND* | 320 |
| Comparative Examples Follow | | | | |
| CEREX ® | 2.0 | 21 | 15 | 160 |
| REEMAY ® 2033 | 2.9 | 15 | 17.0 | 250 | where:
Tear Strength: Test Method D1117-80 (Trapezoid tear test)
Air Permeability: Test Method ASTM D737 at 0.5 inch of water
opsy=ounces per square yard
lbs=pounds
cfm/s=cubic feet of air per minute per square foot
CEREX ® and PBN II ® are nylon 6,6.
ENNY 0239 is a nylon melt blown nonwoven fabric (Ergon in Jackson, Miss.)
REEMAY ® is a polyester
ND*=no data Further details are available in the respective manufacturers' brochures and are so included in this specification by reference. Also included in this specification by reference is the Freudenburg Spunweb Co. in Durham, N.C. product brochures for their LUTRABOND ® nylon (a nylon 6), and LUTRADUR ® polyester spunbond fabrics.

EXAMPLE 1

Using the sod mat propagation technique illustrated in FIG. 5, a wildflower sod consisting of North American Wildflower Mix manufactured by Northrup King Co. in Minneapolis, Minn. and 10% sheep fescue was propagated in a flat containing 1" of a 70/30 volume/volume mixture of FAIRGROW ® woodchips using PBN II ® 0.3 opsy weight as the sod reinforcement. The medium was kept uniformly moist and fertilized with MIRACLE-GRO ® at a concentration of ½ teaspoon once every two weeks.

The following results were obtained:

| Time (days) | Observations and results |
|---|---|
| 17 | Excellent root penetration starting through the PBN II ® |
| 31 | Excellent root penetration of the PBN II ®, roots are matted below the PBN II ® and some thicker roots are apparent. |
| 48 | Excellent root penetration of the PBN II ®, roots are matted below the PBN II ® and some thicker roots are apparent. |
| 80 | Wildflower sod was transplanted and prospered. |

A sample 12 cm by 12 cm section of the sod mat was removed on the 48th day. The roots were carefully shaved off the bottom of the mat (Article 42) with a single edge razor, allowed to dry at ambient conditions, cleaned and then weighed. The root mass weighed 0.3 grams.

EXAMPLE 2

Using the sod mat propagation technique illustrated in FIG. 5, a wildflower sod consisting of North American Wildflower Mix manufactured by Northrup King Co. in Minneapolis, Minn. and 10% sheep fescue was propagated in a flat containing 1" of a 70/30 volume/volume mixture of FAIRGROW ®/woodchips using PBN II ® 0.5 opsy weight as the sod reinforcement. The medium was kept uniformly moist and fertilized with MIRACLE-GRO ® at a concentration of ½ teaspoon per gallon once every two weeks.

The following results were obtained:

| Time (days) | Observations and results |
|---|---|
| 17 | Excellent root penetration starting through the PBN II ® |
| 31 | Excellent root penetration of the PBN II ®, roots are matted below the PBN II ® and some thicker roots are apparent. |

| Time (days) | Observations and results |
| --- | --- |
| 48 | Excellent root penetration of the PBN II ®, roots are matted below the PBN II ® and some thicker roots are apparent. |
| 80 | Wildflower sod was transplanted and prospered. |

A sample 12 cm by 12 cm section of the sod mat was removed on the 48th day. The roots were carefully shaved off the bottom of the mat with a single edge razor, allowed to dry at ambient conditions, cleaned and then weighed. The root mass weighed 0.3 grams.

EXAMPLE 3

Using the sod mat propagation technique illustrated in FIG. 5, a wildflower sod consisting of North American Wildflower Mix manufactured by Northrup King Co. in Minneapolis, Minn. and 10% sheep fescue was propagated in a flat containing 1" of a 70/30 volume/volume mixture of FAIRGROW ® woodchips using PBN II ® 1.0 opsy weight as the sod reinforcement. The medium was kept uniformly moist and fertilized with MIRACLE-GRO ® at a concentration of one half teaspoon per gallon once every two weeks.

The following results were obtained:

| Time (days) | Observations and results |
| --- | --- |
| 17 | Excellent root penetration starting through the PBN II ® |
| 31 | Excellent root penetration of the PBN II ®, roots are matted below PBN II ® and some thicker roots are apparent. |
| 48 | Excellent root penetration of the PBN II ®, roots are matted below the PBN II ® and some thicker roots are apparent. |
| 80 | Wildflower sod was transplanted and prospered. |

A sample 12 cm section of the sod mat was removed on the 48th day. The roots were carefully shaved off the bottom of the mat with a single edge razor, allowed to dry at ambient conditions, cleaned and then weighed. The root mass weighed 0.15 grams.

EXAMPLE 4

Using the sod mat propagation technique illustrated in FIG. 5, a wildflower sod consisting of North American Wildflower Mix manufactured by Northrup King Co. in Minneapolis, Minn. and 10% sheep fescue was propagated in a flat containing 1" of a 70/30 volume/volume mixture of FAIRGROW ® woodchips using PBN II ® 2.0 opsy weight as the sod reinforcement. VISIPORE ® porous polyethylene film was used in the bottom of the flat to facilitate drainage and sod removal. The medium was kept uniformly moist and fertilized with MIRACLE-GRO ® at a concentration of one half teaspoon once every two weeks.

The following results were obtained:

| Time (days) | Observations and results |
| --- | --- |
| 17 | Some root penetration beginning through the PBN II ® |
| 31 | Some long healthy roots have penetrated the PBN II ® but no matting is apparent. |
| 48 | Significant root mat is apparent although it does not completely cover the PBN II ® |
| 100 | Wildflower sod was transplanted and prospered. |

A sample 12 cm by 12 cm section of the sod mat was removed on the 48th day. The roots were carefully shaved off the bottom of the mat with a single edge razor, allowed to dry at ambient conditions, cleaned and then weighed. The root mass weighed 0.1 grams.

EXAMPLE 5

Using the sod mat propagation technique illustrated in FIG. 5, a wildflower sod consisting of North American Wildflower Mix manufactured by Northrup King Co. in Minneapolis, Minn. and 10% sheep rescue was propagated in a flat containing 1" of a 70/30 volume/volume mixture of FAIRGROW ®/woodchips using PBN II ® 3.0 opsy weight as the sod reinforcement. The medium was kept uniformly moist and fertilized with MIRACLE-GRO ® at a concentration of one half teaspoon per gallon once every two weeks.

The following results were obtained:

| Time (days) | Observations and results |
| --- | --- |
| 17 | Some root penetration beginning through the PBN II ® |
| 31 | Some long healthy roots have penetrated the PBN II ® and some matting is apparent. |
| 48 | Significant root mat is apparent although it does not completely cover the PBN II ® |
| 100 | Wildflower sod was transplanted and prospered. |

A sample 12 cm by 12 cm section of the sod mat was removed on the 48th day. The roots were carefully shaved off the bottom of the mat with a single edge razor, allowed to dry at ambient conditions, cleaned and then weighed. The root mass weighed 0.15 grams.

EXAMPLE 6

Using the sod mat propagation technique illustrated in FIG. 5, a wildflower sod consisting of North American Wildflower Mix manufactured by Northrup King Co. in Minneapolis, Minn. and 10% sheep fescue was propagated in a flat containing 1" of a 70/30 volume/volume mixture of FAIRGROW ® woodchips using CEREX ® 0.3 opsy weight as the sod reinforcement. The medium was kept uniformly moist and fertilized with MIRACLE-GRO ® at a concentration of one half teaspoon per gallon once every two weeks.

The following results were obtained:

| Time (days) | Observations and results |
| --- | --- |
| 17 | Good root penetration beginning through the CEREX ® |
| 31 | Excellent root penetration through the CEREX ® and excellent root mat formed on the bottom. Roots appear thick and strong. |
| 48 | Excellent root penetration through the CEREX ® and solid root mat formed below the CEREX ®. Roots appear thick and strong. |
| 80 | Wildflower sod was transplanted and prospered. |

A sample 12 cm by 12 cm section of the sod mat was removed on the 48th day. The roots were carefully shaved off the bottom of the mat with a single edge razor, allowed to dry at ambient conditions, cleaned and then weighed. The root mass weighed 0.5 grams.

EXAMPLE 7

Using the sod mat propagation technique illustrated in FIG. 5, a wildflower sod consisting of North American Wildflower Mix manufactured by Northrup King Co. in Minneapolis, Minn. and 10% sheep fescue was propagated in a flat containing 1" of a 70/30 volume/-volume mixture of FAIRGROW ® woodchips using CEREX ® 0.4 opsy weight as the sod reinforcement. The medium was kept uniformly moist and fertilized with MIRACLE-GRO ® at a concentration of one half teaspoon per gallon once every two weeks.

The following results were obtained:

| Time (days) | Observations and results |
| --- | --- |
| 17 | Good root penetration beginning through the CEREX ® |
| 31 | Excellent root penetration through the CEREX ® and excellent root mat formed on the bottom. |
| 48 | Excellent root penetration through the CEREX ® and good root mat formed below the CEREX ®. Fewer roots appear thick and strong. |
| 80 | Wildflower sod was transplanted and prospered. |

A sample 12 cm by 12 cm section of the sod mat was removed on the 48th day. The roots were carefully shaved off the bottom of the mat with a single edge razor, allowed to dry at ambient conditions, cleaned and then weighed. The root mass weighed 0.4 grams.

EXAMPLE 8

Using the sod mat propagation technique illustrated in FIG. 5, a wildflower sod consisting of North American Wildflower Mix manufactured by Northrup King Co. in Minneapolis, Minn. and 10% sheep fescue was propagated in a flat containing 1" of a 70/30 volume/-volume mixture of FAIRGROW ®/woodchips using CEREX ® 0.5 opsy weight as the sod reinforcement. The medium was kept uniformly moist and fertilized with MIRACLE-GRO ® at a concentration of one half teaspoon per gallon once every two weeks.

The following results were obtained:

| Time (days) | Observations and results |
| --- | --- |
| 17 | Good root penetration beginning through the CEREX ® |
| 31 | Good root penetration through the CEREX ® but roots not matted yet. No thick strong roots apparent. |
| 48 | Excellent root penetration through the CEREX ® and solid root mat formed below the CEREX ®. Roots appear to be thinner than in Example 7 at 48 days. |
| 80 | Wildflower sod was transplanted and prospered. |

A sample 12 cm by 12 cm section of the sod mat was removed on the 48th day. The roots were carefully shaved off the bottom of the mat with a single edge razor, allowed to dry at ambient conditions, cleaned and then weighed. The root mass weighed 0.2 grams.

Some other observations on Examples 1-8

In Examples 1-8 preceding, the 12 cm by 12 cm nylon sod reinforcement of FIG. 1) was also carefully removed from the planting medium (Reference Numeral 44) by slicing the roots carefully and then the integrity of the planting medium (Reference Numeral 44) and root entanglement in the sod medium was checked. In all cases, the "sod" could not hold together even in these small pieces.

EXAMPLE 9

A custom flower mix A1 was prepared with the following species: white yarrow (1%), New England Aster (2%), Bachelor's button (6%), Ox-eye daisy (7%), Lance-leave coreopsis (10%), plains coreopsis (2%), cosmos (17%), purple coneflower (12%), firewheel (10%), Dame's Rocket (8%), Scarlet Flax (15%), Blue Flax (8%), Horse mint (3%), Corn poppy (1%), and Black-eyed Susan (4%) using the general formula given in the "National Wildflower Research Center's Handbook available from the National Wildflower Research Center, Austin, Tex. for guidance. The percentages by weight of each is given in parentheses. Seeding rate was 1 lb per 1000 square feet for Examples 9-12.

Using the sod mat propagation technique illustrated in FIG. 5, this Mix A1 was propagated in a flat containing 1" of a 70/30 volume/volume mixture of FAIRGROW ®/woodchips using PBN II ®0.3 opsy weight as the sod reinforcement. The medium was kept uniformly moist and fertilized with MIRACLE-GRO ® at a concentration of one half teaspoon per gallon once every two weeks.

The following results were obtained:

| Time (days) | Observations and results |
| --- | --- |
| 17 | Excellent root penetration through the PBN II ® is apparent. |
| 31 | Excellent root penetration through the PBN II ® is apparent and good root mat formed below the PBN II ® reinforcement. |
| 100 | Sod mat was transplanted and prospered. |

EXAMPLE 10

Using the sod mat propagation technique illustrated in FIG. 5, this Mix A1 was propagated in a flat containing 1" of a 70/30 volume/volume mixture of FAIRGROW ®/woodchips using PBN II ® 1.0 opsy weight as the sod reinforcement. The medium was kept uniformly moist and fertilized with MIRACLE-GRO ® at a concentration of one half teaspoon per gallon once every two weeks.

The following results were obtained:

| Time (days) | Observations and results |
| --- | --- |
| 17 | Good root penetration through the PBN II ® is apparent. |
| 31 | Good root penetration through the PBN II ® is apparent. |
| 100 | Sod mat was transplanted and prospered. |

EXAMPLE 11 (COMPARATIVE)

Using the sod mat propagation technique illustrated in FIG. 5, this Mix A1 was propagated in a flat containing 1" of a 70/30 volume/volume mixture of FAIRGROW ®/woodchips using CEREX ® 2.0 opsy weight as the sod reinforcement. The medium was kept uniformly moist and fertilized with MIRACLE-GRO ® at a concentration of one half teaspoon per gallon once every two weeks.

The following results were obtained:

| Time (days) | Observations and results |
|---|---|
| 17 | No root penetration through the CEREX ® is apparent. |
| 31 | No root penetration through the CEREX ® is apparent. |

EXAMPLE 12 (COMPARATIVE)

Using the sod mat propagation technique illustrated in FIG. 5, this Mix A1 was propagated in a flat containing 1" of a 70/30 volume/volume mixture of FAIRGROW ®/woodchips using REEMAY ® 2033 (3.0 opsy weight) as the sod reinforcement. The medium was kept uniformly moist and fertilized with MIRACLE-GRO ® at a concentration of one half teaspoon per gallon once every two weeks.

The following results were obtained:

| Time (days) | Observations and results |
|---|---|
| 17 | No root penetration through the REEMAY ® 2033 is apparent. |
| 31 | No root penetration through the REEMAY ® 2033 is apparent. |

EXAMPLE 13

Using the sod mat propagation technique illustrated in FIG. 5, liriope spicata plugs were added to a flat containing 5 cm of a commercial soil-less potting medium REDI-EARTH ® and a PBN II ® 1.0 opsy reinforcement. The liriope was watered and fertilized for 9 months. A healthy sod mat was then harvested from the flat.

EXAMPLE 14

Using the sod mat propagation technique illustrated in FIG. 5, euonymous plugs on a 20 cm grid were added to a flat containing 2.5 cm of a commercial soil-less potting medium REDI-EARTH ® and a PBN II ® 1.0 opsy reinforcement. The euonymous was watered and fertilized for 6 months. A healthy sod mat was then harvested from the flat.

EXAMPLE 15

Using the sod mat propagation technique illustrated in FIG. 5, cherry tomato seeds were planted in a flat containing 2.5 cm of a commercial soil-less potting medium REDI-EARTH ® and a PBN II ® 0.5 opsy reinforcement. The cherry tomatoes were watered and fertilized for 2 months. A useful sod mat was then harvested from the flat.

EXAMPLE 16

Using the sod mat propagation technique illustrated in FIG. 5, wildflower mix A1 was planted at a seeding rate of about 1.5 lbs/1000 sf in a flat containing 2.5 cm of a 70/30 volume/volume mixture of FAIRGROW ®/woodchips and a Ergon ENNY 0239 opsy reinforcement. Ergon ENNY 0239 is a nylon melt blown nonwoven fabric with a basis weight of 0.4 opsy. The wildflower mix was watered and fertilized for 8 months. A useful sod mat was then harvested from the flat.

EXAMPLE 17

Using the sod mat propagation technique illustrated in FIG. 5, cherry tomato seeds were planted in a flat containing 2.5 cm of 70/30 volume/volume mixture of FAIRGROW ®/woodchips and a LUTRABOND ® 0.3 opsy reinforcement. About 2 grams of cosmos seed was planted, watered and fertilized for 2 months. A useful sod mat was then harvested from the fLat.

Summary, Ramifications, and Scope

Accordingly, the reader will see that this invention can be used to economically and flexibility produce custom, high quality plant sod mats for the grower, landscaper and final customer. Many unique advantages are made available to these customers with this invention, such as faster root penetration and entanglement, low equipment costs, economical small volume production costs, and high quality sod mats of many different herbs, vegetables, flowers and groundcovers. Furthermore multiple soil or soil-less mediums are practical because of the unique flexibility of the nylon sod reinforcements discovered, and sod mats with viable seedlings, root divisions, rooted cuttings or plant plugs which give instant beautification and make installation easier for the landscaper or homeowner. In addition, unique advantages are offered to both environment and customers by reducing packaging waste, reducing synthetic plastic reinforcement consumption, reducing the synthetic reinforcement planted with the sod along with the added advantage of having a reinforcement which will decompose when exposed to light. The strength of the sod mat is tailored to the grower's and landscaper's requirements. The grower receives still more advantages by reducing his need for inventory, storage, disposal and handling costs associated with a complex array of planting pots and flats by using some simple rolls of nylon sod reinforcement which serve multiple plant species.

Although the specification and examples contain many specifications, these should not be construed as limiting the scope of the invention but as merely providing illustrations of selecting some of the presently preferred embodiments of this invention. One of ordinary skill in the art with ordinary experimentation using the examples and disclosures can propagate many new and useful sod mats based on nylon sod reinforcements within the scope and meaning of the claims. For example, single species of hard-to establish wildflowers could be grown under controlled conditions until they were large enough to be "released to the wild", that is, installed to form an instant stand of the desired species. Specialty gardens such as "butterfly gardens", "moonlight gardens" or herb gardens could be sold in a compact, established form, cut up, and easily installed by the customer. Nylon spunbond fabrics which are off specification for many reasons could be used efficiently in this process—even small sizes which may be overlapped and "stitched together" by root penetration. Various known technologies may be combined with this invention such as automating the production of these sod mats for greenhouses, cooling the sod mat to dormancy for storage or shipping purposes, using various commercial soil wetting agents and hydrogels, and using commercial slow release fertilizers.

Thus the scope of the invention should be determined by the appended claims and their legal equivalents, rather than by examples given. The examples and limitations in the specification are merely illustrations of some of the presently preferred embodiments of this invention and are not to be construed as limiting the claims in anyway.

We claim:

1. A new and improved plant sod mat comprising the following:
   a. a nylon sod reinforcement wherein said nylon sod reinforcement comprises a nylon nonwoven fabric with a fabric basis weight of less than 2 opsy;
   b. a layer of planting medium on said nylon sod reinforcement and;
   c. viable plants growing in said planting medium and whose roots penetrate and entangle with said nylon sod reinforcement and thus form a sod mat.

2. A new and improved sod mat of claim 1 wherein said nylon sod reinforcement is comprised of a nonwoven fabric selected from the group consisting of spunbond nonwoven fabrics, hydroentangled nonwoven fabrics, and melt blown nonwoven fabrics.

3. A new and improved sod mat of claim 1 wherein said plants are garden plants.

4. A new and improved sod mat of claim 3 wherein said nylon sod reinforcement is comprised of a nonwoven fabric selected from the group consisting of spunbond nonwoven fabrics, hydroentangled nonwoven fabrics, and melt blown nonwoven fabrics.

5. A new and improved sod mat of claim 3 wherein said nylon sod reinforcement is comprised of a nonwoven fabric selected from the group consisting of spunbond nonwoven fabrics, hydroentangled nonwoven fabrics, and melt blown nonwoven fabrics and said plants are ornamental plants.

6. A new and improved sod mat of claim 3 wherein said nylon sod reinforcement is less than or equal to about 0.5 opsy and said nylon sod reinforcement is comprised of nylon resins selected from the group consisting of nylon 6 and nylon 6,6.

7. A new and improved plant sod mat comprising:
   a) a layer of planting medium;
   b) viable plants in said planting medium with well developed roots;
   c) a means for reinforcing said planting medium with said viable plants growing in said planting medium comprising a nylon sod reinforcement wherein said nylon sod reinforcement comprises a nylon nonwoven fabric with a fabric basis weight of less than about 3 opsy which facilitates good root penetration and entanglement from said plants and thus, forms a sod mat.

8. A new and improved plant sod mat of claim 7 wherein said plants comprise garden plants.

9. A new and improved plant sod mat of claim 7 wherein said nylon sod reinforcement is less than or equal to about 2 opsy.

10. A new and improved plant sod mat of claim 9 wherein said nylon sod reinforcement is a hydroentangled nonwoven fabric.

11. A new and improved plant sod mat of claim 7 wherein said nylon nonwoven fabric is less than or equal to about 0.5 opsy.

12. A new and improved sod mat comprising a garden plant sod mat reinforced with an effective nylon sod reinforcement wherein said nylon sod reinforcement comprises a nylon nonwoven fabric with a basis weight or less than about 2 opsy and plant roots penetrate and entangle with said nylon nonwoven fabric and planting medium to form a sod mat.

13. A new and improved sod mat of claim 12 wherein said nylon nonwoven fabric comprises a nylon hydroentangled fabric.

14. A new and improved sod mat of claim 12 wherein said nylon nonwoven fabric comprises a pattern bonded, nylon nonwoven fabric with an area ratio of the nonbonded fiber region to the bonded fiber region of greater than about 2/1.

15. A new and improved sod mat of claim 12 wherein said nylon nonwoven fabric is comprised of a nylon nonwoven fabric selected from the group consisting of a pattern bonded, nylon nonwoven fabric and pattern entangled, nylon nonwoven fabrics.

16. A new and improved sod mat of claim 12 wherein said nylon sod reinforcement has a fabric basis weight of less than or equal to about 0.5 opsy and said plants comprise ornamental plants.

17. A new and improved sod mat of claim 12 wherein said plants comprise ornamental plants.

18. A new and improved sod mat of claim 17 wherein said nylon nonwoven fabric is a pattern entangled, nylon nonwoven fabric.

19. A new and improved sod mat of claim 17 wherein said nylon nonwoven fabric is a pattern bonded, nylon nonwoven fabric and said nylon nonwoven fabric has an area ratio of a nonbonded fiber region to a bonded fiber region of greater than 4/1.

20. A new and improved sod mat of claim 17 wherein said nylon nonwoven fabric is a pattern bonded, nylon nonwoven fabric and said nylon nonwoven fabric has an area ratio of a nonbonded fiber region to a bonded fiber region from about 15/1 to 100/1.

* * * * *